No. 830,031. PATENTED SEPT. 4, 1906.
W. E. WILLIAMS.
MATCH MAKING MACHINE.
APPLICATION FILED OCT. 18, 1897.

7 SHEETS—SHEET 1.

Witnesses:

Inventor:
W. E. Williams

No. 830,031. PATENTED SEPT. 4, 1906.
W. E. WILLIAMS.
MATCH MAKING MACHINE.
APPLICATION FILED OCT. 18, 1897.

7 SHEETS—SHEET 2.

Witnesses:
Fred Borg
Frank W. Murphy

Inventor:
W. E. Williams

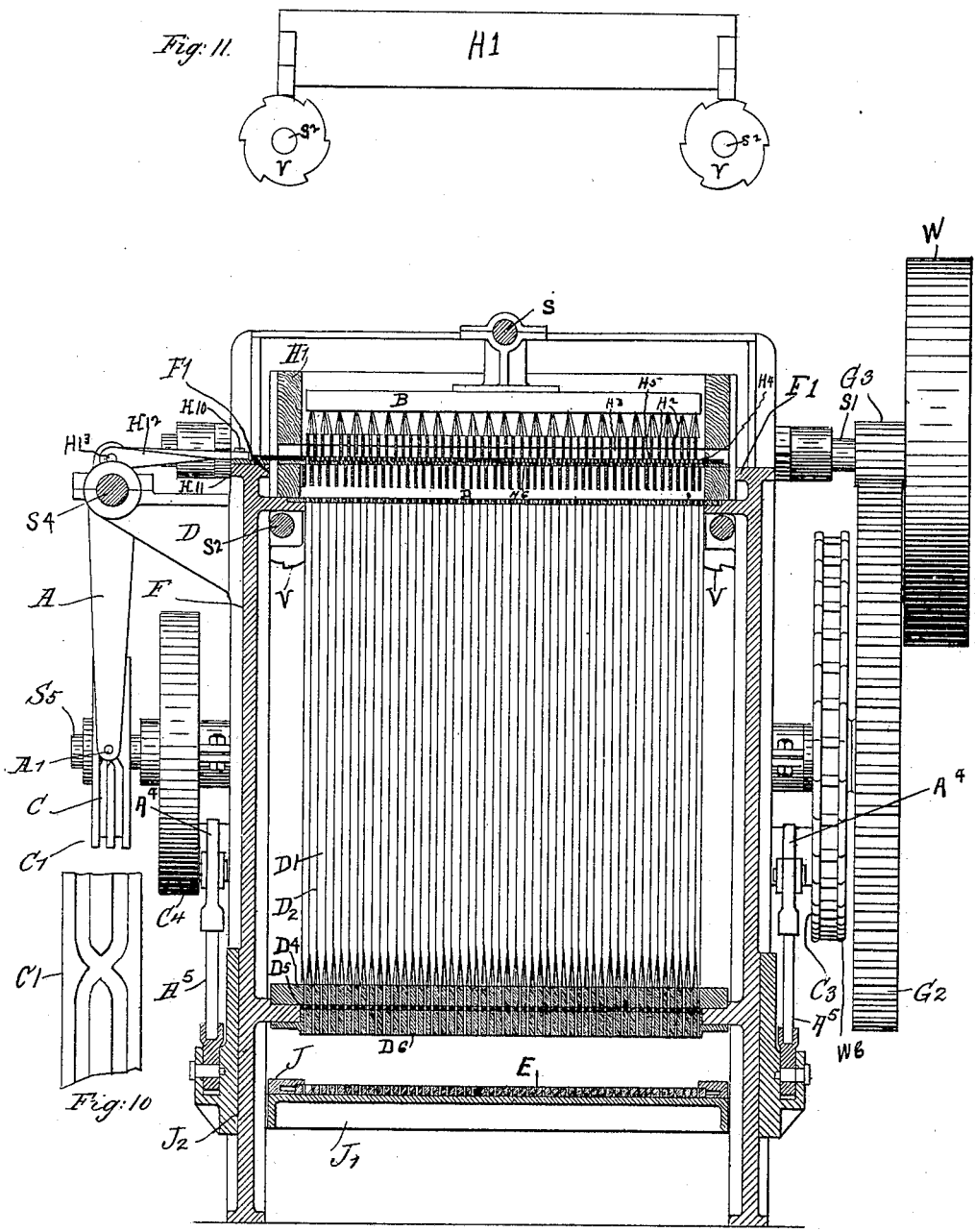

No. 830,031. PATENTED SEPT. 4, 1906.
W. E. WILLIAMS.
MATCH MAKING MACHINE.
APPLICATION FILED OCT. 18, 1897.
7 SHEETS—SHEET 6.
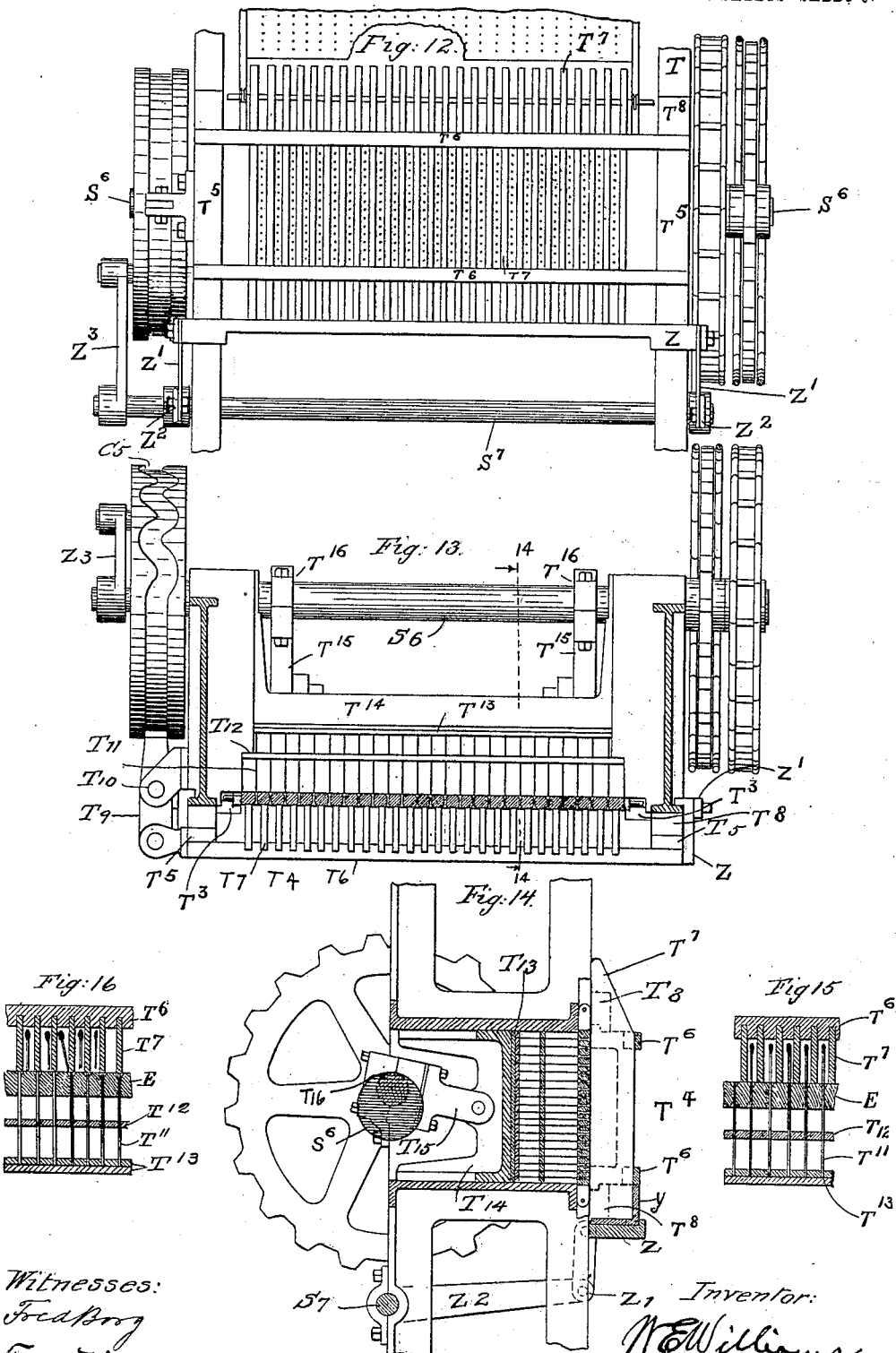

No. 830,031. PATENTED SEPT. 4, 1906.
W. E. WILLIAMS.
MATCH MAKING MACHINE.
APPLICATION FILED OCT. 18, 1897.
7 SHEETS—SHEET 7.
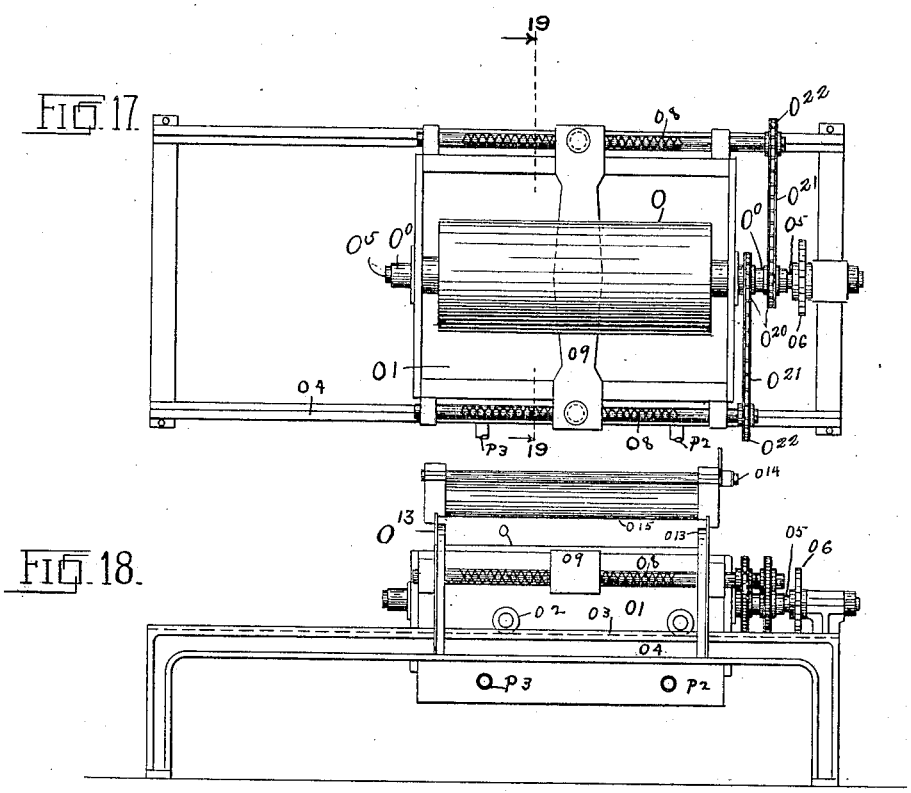
Witnesses.
Inventor:
W. E. Williams

UNITED STATES PATENT OFFICE.

WILLIAM ERASTUS WILLIAMS, OF CHICAGO, ILLINOIS, ASSIGNOR, BY MESNE ASSIGNMENTS, TO DIAMOND MATCH COMPANY, A CORPORATION OF ILLINOIS.

MATCH-MAKING MACHINE.

No. 830,031.      Specification of Letters Patent.      Patented Sept. 4, 1906.

Application filed October 18, 1897. Serial No. 655,593.

*To all whom it may concern:*

Be it known that I, WILLIAM ERASTUS WILLIAMS, a citizen of the United States, residing at Chicago, in the county of Cook and State of Illinois, have invented a new and useful Improvement in Match-Making Machines, of which the following is a specification.

My invention relates to machines for assembling, dipping, drying, and unloading matches ready for packing; and the object of my invention is to produce a machine that will assemble the splints from promiscuity, stick, dip, dry, and unload them in regular order in the quickest, simplest, and cheapest manner possible and also to provide devices having special merits, as described herein; and the invention consists in the devices set forth in the claims hereof.

Reference will be had to the accompanying drawings, in which—

Figure 3:
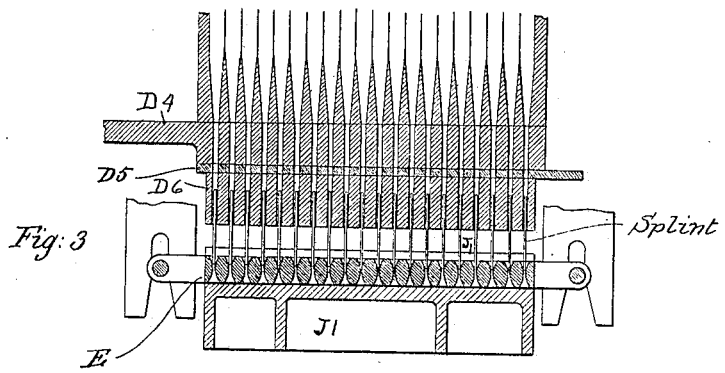
Figure 1:
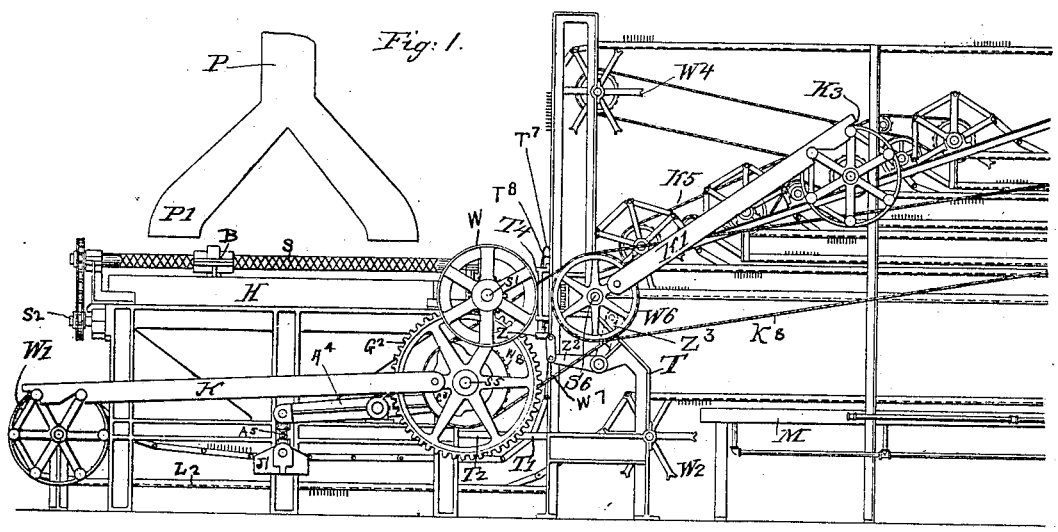
Figure 2:
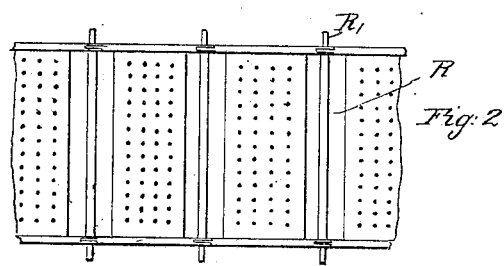
Figure 5:
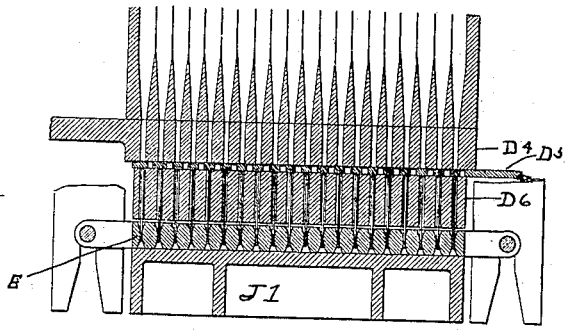
Figure 4:
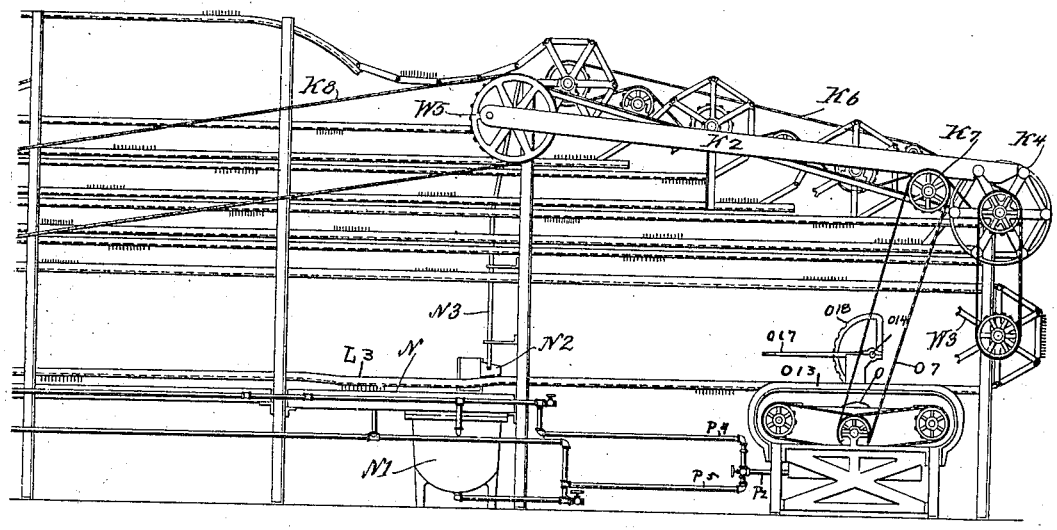
Figure 6:
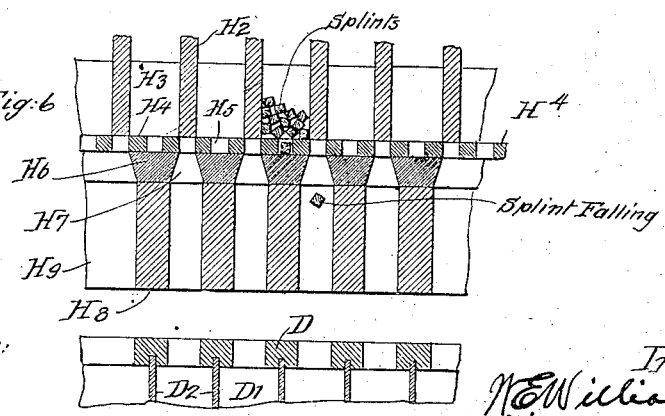
Figure 7:
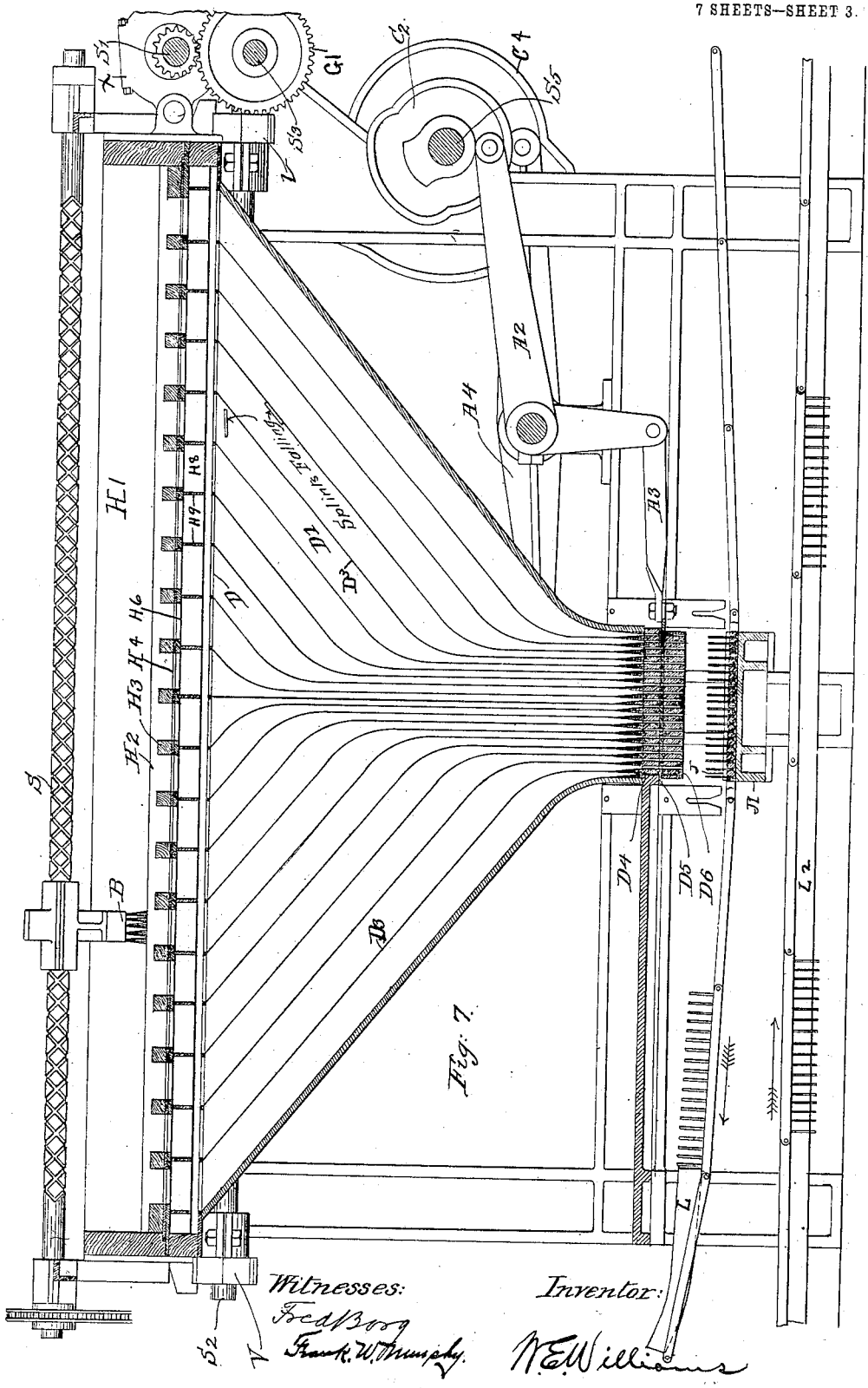
Figure 8:
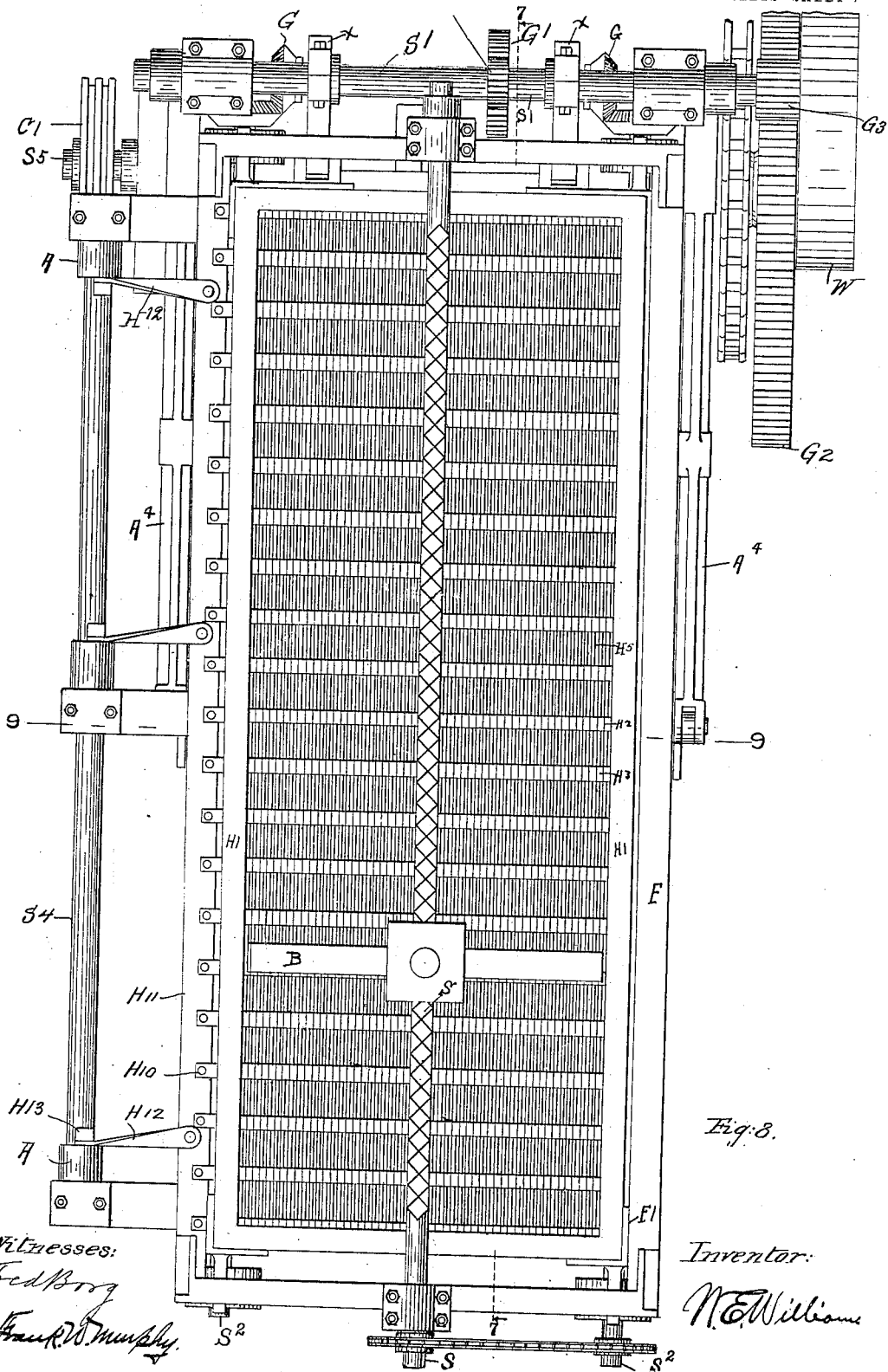

Figure 1 is a side view of the front end of the organized machine. Fig. 2 is a plan of a section of the chain of perforated plates. Fig. 3 is a sectional detail view showing the position of the sticking mechanism just prior to the sticking of one set of splints. Fig. 4 is a side view of the rear end of the organized machine, which, taken in connection with Fig. 1, gives a complete side view of the entire machine. Fig. 5 is a sectional view of the same parts that are shown in Fig. 3, but in the position they occupy at the completion of the sticking of the splints. Fig. 6 is a transverse sectional detail view of part of the splint-separating mechanism. Fig. 7 is a side sectional view of the assembling and sticking mechanism. Fig. 8 is a plan view of the parts shown in Fig. 7. Fig. 9 is a transverse sectional view on line 9 9, Fig. 8. Fig. 10 is a detail showing a certain cam-slot. Fig. 11 is an end detail view of the splint-hopper vertical vibrators. Fig. 12 is a front view of the unloading mechanism. Fig. 13 is a plan view of the devices of Fig. 12. Fig. 14 is a sectional view on line 14 14, Fig. 13. Fig. 15 is a plan detail showing matches at the instant of unloading. Fig. 16 is a similar view to Fig. 15, showing the position of the match-separators when vibrated. Fig. 17 is a plan view of the composition-applying device. Fig. 18 is a side view of the parts shown in Fig. 17. Fig. 19 is a vertical section on line 19 19, Fig. 17. Fig. 20 is a diagrammatical plan view showing the arrangement of steam-pipe connections to the composition-box.

The splints, previously prepared, are conveyed to the hopper of the machine by a pipe P, which is provided with four orifices P', delivering the splints at four points in the hopper H of the machine. The purpose is to spread the splints nearly uniformly on the surface of the bottom of the hopper H, and to further insure such spreading a traveling brush B is carried by a return-screw S forward and backward through the hopper.

The hopper H is simply a square box having a peculiarly-designed bottom, and it is vibrated both longitudinally and vertically, which causes the splints to assume a regular position in pockets provided in the bottom of the hopper. The hopper H, made with side walls H', Figs. 8 and 9, and guided by the side frames F F', is vibrated longitudinally by the eccentrics X on the main driving-shaft S', which is driven by the belt-wheel W, and is also vibrated vertically by notched wheels V on a shaft $S^2$, mounted alongside the frame and driven by bevel-gears G from a shaft $S^3$, (see Fig. 7,) driven by spur-gears G' from the main shaft S'. The return-screw shaft S is driven by a chain and sprockets from one of the shafts $S^2$.

In the bottom of the hopper H (see Figs. 6, 7, 8, and 9) there are longitudinal slats $H^2$, set vertically, and cross-bars $H^3$, which divide the bottom into a number of pockets a little longer than the match-splints and sufficiently narrow to cause the splints by vibratory motion to assume a regular order in the pockets. The brush B prevents any splints from remaining in a vertical position. At the bottom of the pockets there is a plate $H^4$, having slots $H^5$ just large enough to admit one splint at a time, and this plate lies on top of another plate $H^6$, having slots $H^7$, and to support these plates $H^4$ and $H^6$ there is a framework composed of longitudinal bars $H^8$ and cross-bars $H^9$, which are fixed solidly into the side walls of the hopper. The plate $H^6$ is rigidly fixed in the hopper in such position that its slots $H^7$ are immediately beneath the slats $H^2$, while the plate $H^4$ is movable sidewise and in shifting carries (in its pockets) the splints to points beneath the slats $H^2$ and over the slots H⁷, where the splints thus carried can drop. A splint is shown in the act of falling in Fig. 6 and Fig. 7.

The plate H⁴ is connected at points H¹⁰, Fig. 8, to a bar H¹¹, connected by links H¹² to pivots H¹³ on a shaft S⁴, which has an arm A carrying a pivot-block A', Fig. 9, working in cam-slots C of a cam-wheel C' on shaft S⁵. The shaft S⁵ is driven by the gear G², which is driven by the pinion G³ on the main shaft of machine. The cam-slots C are shown in Fig. 10 and are such that at one revolution of wheel C' the pivot-block A' travels in the slot at one side and at the next revolution it crosses over and travels in the slot at the other side, and at each move of the arm A the plate H⁴ is shifted to the right or to the left, carrying a set of splints at each movement to be dropped out of the hopper through the slots H⁷. The shaft S⁵ revolves slowly enough to permit a new set of splints to be shaken into the slots H⁵ of plate H⁴ at each revolution. Thus sets of splints are separated and discharged in regular order from the hopper at each revolution of shaft S⁵. Connecting the two side frames F at the top is a plate D, (see Figs. 6, 7, and 9,) which is also slotted, allowing the splints which fall from the hopper to drop through it into the chutes or guideways D' below the plate D. These guideways, one for each pocket in the hopper, are made of vertical sheets of metal D², Fig. 9, having inclined ribs D³, Fig. 7, on which the splints fall and by which they are guided downward to a vertical position the right distance apart to be stuck for dipping.

The guides D' terminate at a perforated plate D⁴, beneath which there is a shifting perforated plate D⁵, and underneath the latter there is a perforated guide-plate D⁶. The shifting plate D⁵ is shifted at each revolution of the shaft S⁵ by the cam C², acting through the arm A² and link A³, connected to the plate D⁵.

The splints fall to the position shown in Fig. 3, where they rest in the ends of the perforations in the plates E, into which they are to be stuck. The perforated plates are linked together in a chain and pass through guides J of a platen J', which is moved up and down in guides J², Fig. 9, by cams C³ and C⁴, acting through arms A⁴ and links A⁵, connected to the platen. The platen is moved from the position of Fig. 3 to that of Fig. 5, where the splints are firmly stuck in the perforations of the plate E, the plate D⁵ being shifted to close the perforations to the upward movement of the splints, thereby acting as an abutment-plate, and immediately upon the sticking of the splints the platen J' descends to the position shown in Fig. 7. When the chain of perforated plates is moved forward and at every revolution of shaft S⁵, a perforated plate E is stuck with splints. The chain of plates E, Figs. 2, 7, is made with somewhat wide spaces between the bodies of the plates to permit passing over small sprockets, and they are connected by transverse pivotal rods R, having protruding ends R' for engaging the sprockets. The plates after being stuck pass over the drive-wheel S⁴, Fig. 1, which is driven by a finger K, carried by a wrist-pin on gear G², the chain being depressed near the wheel by guides L, beneath which the rod projections R' pass. From the wheel W' the chain passes back along the guides L² under the sticking mechanism, over the guide-wheel W², over heaters M, where the ends of the splints are heated, and thence to a paraffining-vat N, Fig. 4. The guides L³ at this point are depressed, permitting the ends of the splints to dip into the paraffin contained in the shallow tank N. A reservoir-tank N' is provided to constantly supply the tank N with fresh paraffin by means of a bucket N², Fig. 4, which is connected by a pitman N³ to a crank on the shaft of a chain-driving wheel W⁵, whereby paraffin is intermittently supplied to the tank N, from which the surplus runs back to the tank N'. From the paraffin-tank the chain, with the splints, passes onto a composition-roller O, where the head is applied. The composition-applying device is shown in Figs. 17, 18, 19, and 20 and has several merits. The roller O is mounted in a water-jacketed box O', carried on rollers O², resting on guideways O³ of a frame O⁴, which extends out beyond the guideways or frames in which the chain of plates is carried. This construction permits the box or vat to pass along the frame out from beneath the plate-chain, so that all parts are conveniently accessible. The chain of plates in passing over the box is supported in a guideway O¹³, borne by the frame. Above the guideway and supported thereby is a rock-shaft O¹⁴, having arms which carry a roller O¹⁵ to hold down the plates of the chain and blocks O¹⁶, which project beneath the chain. The shaft O¹⁴ is rocked by a hand-lever O¹⁷, locked in any desired position by means of an ordinary lever-quadrant O¹⁸. Obviously if the lever is depressed the roller O¹⁵ forces the chain toward the composition-roller O, while if it be raised the blocks O¹⁶ lift the chain, so that the splints are held out of contact with the composition-roller.

Mounted upon each side of the box parallel to the roller O is a return-screw O⁸, which carries back and forth one end of a stirrer and scraper O⁹, fitting the internal contour of the box and filling the space between it and the roller. The shaft O⁰ of the roller is hollow and serves as a sliding bearing for one end of a splined shaft O⁵, driven by a chain O⁷ and sprocket-wheel O⁶ and having its other end journaled in the frame O⁴. The hollow shaft O⁰ projects beyond the end wall of the box and bears sprocket-wheels O²⁰, connected by chains $O^{21}$ with sprocket-wheels $O^{22}$, respectively, upon the corresponding ends of the return-screw shafts, and thus the return-screws are driven by the shaft $O^5$. From the construction described it is evident that while the shaft $O^6$ is freely movable longitudinally upon the splined shaft $O^5$ the two shafts rotate as a unit, and hence, irrespective of the position of adjustment of the box, its roller O rotates with the shaft $O^5$.

From composition-roller the chain passes up over wheel $W^3$ and back and forward over guides and wheels to and over wheel $W^4$, from whence it passes to the unloading mechanism. During the passage to this point the composition has dried sufficiently to permit the matches to be unloaded. The chain is driven intermittently by the fingers K K' $K^2$, Figs. 1 and 4. Fingers K' and $K^2$ drive wheels $K^3$ and $K^4$, which drive chain $K^5$ and $K^6$ on the other side of the frame and drive the several wheels over which the chain of plates passes in order to permit slack at the several points of turning and not put too great a strain at any one point. Chain $K^6$ also drives shaft $K^7$, on which is the sprocket which drives the composition-roller. Finger $K^2$ is carried by wheel $W^5$, driven by chain $K^8$ from wheel $W^6$, driven by shaft $S^6$, which actuates unloading mechanism and is driven by a sprocket-chain $W^7$ from a sprocket $W^8$ on cam $C^3$ on shaft $S^5$. The unloading mechanism, Figs. 1, 12, 13, and 14, is mounted upon a frame T, connected by bars T' to the sticking-mechanism frame, and the bars T' support a platform $T^2$, on which the operator stands to take away the matches. The chain of plates passes down in the embrace of the guides $T^3$ to the unloading platen.

Mounted in front of the frame T there is a frame $T^4$, composed of the end blocks $T^5$ and cross-bars $T^6$, carrying the operator-bars $T^7$. The frame $T^4$ is held by blocks $T^8$ to frame T and is vibrated laterally, sliding in blocks $T^8$, by the lever $T^9$, pivoted at $T^{10}$ to frame T and vibrated by the cam $C^5$. The separator-bars $T^7$ bear against the perforated plates and resist the thrust of punching out the matches, and they pass between the rows of matches in the plates and are vibrated only for a short interval immediately after the matches are punched out. The purpose of this vibration is to insure the complete release of all the matches from the plate, since a match will sometimes stick, by a sliver, to the holes and will not fall when punched out. (See Figs. 15 and 16, where Fig. 15 shows matches at the instant of completion of the punching and Fig. 16 shows matches being crowded off by the vibration of bars $T^7$.)

The matches are punched out by punches $T^{11}$ passing through a stripper or guide-plate $T^{12}$ and held by plates $T^{13}$ to a platen $T^{14}$, actuated by links $T^{15}$, connected to cranks $T^{16}$ in shaft $S^6$, driven as before described. The travel of the platen is so much in excess of that required to do the punching that the punches are withdrawn from the perforated plates at all times during the movement of the plates, and this is made necessary by the constant travel of the shaft $S^6$ and intermittent travel of the chain of plates E.

The matches when punched out of plates E fall down into the tray Y, (see Fig. 14,) which tray Y is supported on a bracket Z, which slides vertically on guides on frame T and is supported and vibrated vertically by links Z', connected to arms $Z^2$ on shaft $S^7$, which is vibrated by arm $Z^3$ working in cam-slot in sides of cam-wheel $C^5$. The movement of the bracket Z by its cam is such that the bracket moves up and rests in its uppermost position (shown in Fig. 14) and remains in that position until the matches are unloaded and the frame $T^4$ has ceased to vibrate laterally, and when in this position the bars $T^7$ project downward into tray Y and there serve to guide the falling matches to a right position in the tray. When the matches are unloaded and shaken down, the bracket Z, with its tray Y, moves down below clear of the ends of bars $T^7$ and then vibrates rapidly vertically through a short distance, leveling the matches in the tray. When the operator moves the tray and places a new one in its place, the bracket Z moves the new tray up to catch another load, and so on, *ad libitum*.

Many of the devices I use in this machine may be used with other match-machines differing widely in general design, and I desire to protect the devices separately, (as well as in the combinations shown,) as, for illustration, the mechanism for unloading the matches and leveling them in the trays, the special construction of the composition-applying device, mechanism for sticking splints, (which may be used with other means of separating them,) and mechanism for guiding the splints from a distance apart to the close vertical position for sticking. Other special features that will be set forth in the claims can be used in other combinations, so that I desire to cover broadly the several new features of the machine in whatsoever manner they may be used. Instead of the chain of perforated dipping-plates E shown for carrying the match-sticks I may use other methods of holding the match-sticks.

In some of the claims I use the term "splint-holder," by which is meant mechanism to perform a function similar to that of the plate $D^6$, and I also use the term "abutment-plate," by which is meant mechanism to perform a function similar to that of the plate $D^5$ when stopping off the ends of the splints. The word "magazine" for splints is used in the claims sometimes in the sense of the hopper H and at other times in the sense of the pockets within the hopper. By the term "separating the splints individually" is meant that separation of each splint from its neighbor sufficient to permit the dipping.

What I claim is—

1. The combination with a splint-hopper having its lower portion divided into cells or pockets, of a plate forming the bottom of said cells and having apertures each adapted to receive one horizontal splint only and all in proper relative position for simultaneously communicating with the cells, respectively, and means for alternately allowing and preventing splints to drop from said apertures, together with means for turning the descending splints from a horizontal to a vertical position, and splint-dipping means to receive the vertically-disposed splints.

2. The combination of a vibrating leveling-hopper, provided with pockets in which the match-splints are assembled by vibration in a horizontal position, of a movable apertured plate lying in the bottom of the hopper, beneath the pockets, with a fixed apertured plate lying beneath the movable plate, the apertures of the fixed plate lying directly underneath the walls of the pockets, substantially as described.

3. The combination with a hopper having its lower part divided into cells or pockets each adapted to contain a plurality of horizontal, approximately parallel splints, of means for at intervals discharging, one from each pocket, a set of splints, and converging guideways arranged for bringing closer together and regularly spacing the falling splints of such set, whereby the splints are arranged in sets in proper relative position for dipping.

4. The combination with a hopper having its lower part divided into cells each adapted to receive a plurality of horizontal parallel splints, of a plate forming a bottom for said cells and having apertures each adapted to receive one horizontal splint only and all in proper relative position for communicating simultaneously with the cells, respectively, devices below the plate for obstructing said apertures when the plate is in one position but not when it is in another position, and means for moving the plate alternately from one to the other of said positions, whereby rows of splints may be permitted to drop through apertures at predetermined intervals, together with means for turning the descending splints from a horizontal to a vertical position, and splint-dipping means to receive the vertically-disposed splints.

5. The combination of a hopper or magazine for splints, of mechanism for dropping splints horizontally in spaced rows or sets from said hopper or magazine, guideways for directing the respective rows or sets of horizontal splints to vertical position during their descent, and a dipping frame or plate to receive the vertically-disposed splints.

6. The combination with a splint-hopper, of means for arranging splints horizontally in the bottom of the hopper, means for discharging a set of widely-separated splints from the bottom of the hopper, and guideways for directing the splints into vertical position and the closer order proper for dipping.

7. The combination of a hopper or magazine for the splints, mechanism for separating in regular order a set of splints at a time from the magazine or hopper, a splint-holder for holding the splints, after separation, in position to be occupied in the frame or plate; an abutment-plate for shutting off the movement of the splints in one direction, and a splint-dipping plate or frame and means for moving it in such a direction that its splint-apertures shall engage the splints held in opposition by the abutment-plate.

8. The combination with splint-separating mechanism, of a plurality of guideways beneath the same, means for delivering the splints to said guideways in horizontal position, said guideways comprising inclined receiving portions of a width to receive horizontal splints and vertical discharging portions of a width to maintain the splints in vertical position, said inclined and vertical portions being connected by converging curved portions, together with splint-dipping frames or plates adapted to receive the splints from the vertical portions of the guideways.

9. The combination of guideways for a set of splints; a movable perforated abutment-plate, lying within and across the guideways, the perforations of the abutment-plate arranged to coincide with the guideways when in registering position thereto, and to stop off the guideways in reverse position; a dipping plate or frame lying with its splint-apertures in line with the guideways; and mechanism for moving the dipping-plate in such a manner that the splints are forced therein from abutting against the perforated abutment-plate.

10. The combination of a perforated splint-holding guide-plate, a movable abutment-plate lying at the top of the guide-plate for stopping the movement of the splints out of the guide-plate, a dipping plate or frame lying at the bottom of the guide-plate, and a platen for holding and moving the dipping-plate upward and downward in the sticking of the splints.

11. The combination of a splint-magazine wherein a number of rows of splints are held in a horizontal position in regular order; mechanism for discharging in parallel relation to each other a set of splints from each row; guideways to receive and guide from a horizontal to a vertical position, the splints so discharged, said guideways including inclined portions corresponding in width to the length of a splint, or substantially so, vertical portions corresponding in width to that of a splint, or substantially so, and converging portions connecting said inclined and vertical portions, together with a dipping frame or plate to receive the splints from the vertical portions of the guideway.

12. The combination of a splint magazine or hopper, provided with pockets for holding the splints in parallel relation; a slotted bottom plate for the pockets for removing single splints at a time from the pockets; and means for vibrating the hopper vertically and horizontally.

13. The combination with a hopper having its lower portion divided into cells to receive collections of horizontal splints, of a brush arranged to travel bodily over the cells to remove lodged splints and assist in leveling.

14. The combination with a hopper having its lower portion divided into numerous cells or pockets, of a brush lying just above the plane of the cells, and a return-screw engaging the brush to carry it bodily back and forth over the cells, and means for rotating the return-screw.

15. The combination with means for arranging a set of splints in proper relation for dipping, of a dipping-plate, means for bringing the latter into registry with the set of arranged splints, a perforated abutment-plate movable in respect to the path of the splints so as to set the perforations into or out of alinement therewith, and means for moving the dipping-plate toward and away from said abutment-plate.

16. The combination with a splint-hopper and means for vibrating the same, of means for successively discharging sets of separated splints from the hopper, and stationary guideways comprising inclined and vertical portions arranged to receive the falling splints of each set and direct them into proper relative position for dipping.

17. The combination with a hopper for leveling the splints, of means for vibrating the hopper, a slotted plate in the bottom of the hopper, a slotted frame immediately below the plate, means for moving said plate to bring its slots alternately into and out of registry with the slots of said frame, a splint-holder at some distance below said frame, and a set of guideways comprising inclined and vertical portions for directing into the holder the splints passing through the slots of the plate and frame.

18. The combination of a hopper or magazine for splints, longitudinal vibrators for said hopper or magazine, vertical vibrators for said hopper or magazine acting upon the hopper independently of the longitudinal vibrators, means for separating horizontal rows of splints from the contents of the hopper, guide devices for arranging said rows of splints in vertical position, and a plate or holder to receive the vertically-disposed splints.

19. The combination of magazines for the splints, a movable apertured plate for separating the splints in their individuality, guideways or splint-holders for receiving the splints from the apertured plate, a cutting-off plate $D^5$ for closing the guideways, and mechanism for automatically actuating the apertured plate and the cutting-off plate $D^5$ in proper time in relation to each other.

20. The combination of a magazine for the splints, a movable apertured plate for separating the splints in their individuality, guideways or splint-holders for receiving the splints from the apertured plate, a cutting-off plate for the guideways or splint-holders; and mechanism for automatically vibrating the hopper or magazine and moving the apertured plate and the shutting-off plate in proper time for the purpose described.

21. The combination, of a hopper or magazine for the splints, pockets for holding the splints in position in the magazine, vibrators for the magazine, apertures or receptacles for admitting single splints separated from the magazine by vibration, means for releasing the splints from the apertures, guides or supports for the splints so released, an abutment or shutting-off plate, and mechanism for automatically operating the same in proper time in relation to the other mechanism.

22. A composition box or vat and its composition-applying roller mounted to be withdrawn from underneath the splint-carrier combined with mechanism for driving the roller in all positions.

23. A composition box or vat and its composition-applying roller mounted to be moved longitudinally and having its driving-shaft splined to permit the movement of the roller and still drive the same.

24. The combination with a chain of match-plates, of a set of punches for unloading the matches from the chain, a set of bars parallel to the face of the plate in position for unloading, for preventing material lateral displacement of the falling matches, and means for vibrating the bars laterally.

25. The combination with a chain of match-plates of an unloading device for the matches, a set of bars parallel to the face of the plate in position for unloading, for preventing material lateral displacement of the falling matches, mechanism for vibrating the bars, a receiving-tray to catch the matches, and mechanism for raising and lowering the tray.

26. The combination with a chain of match-plates of an unloading device for the matches, a receiving-tray for the matches, and mechanism for moving the tray upward and downward over the face of the plate in position for unloading, holding it at rest and for vibrating it for the purpose described.

27. The combination with a chain of match-plates, of an unloading punching-platen, a set of bars parallel to the face of the plate in position for unloading, for preventing material lateral displacement of the falling matches, a cam movement for vibrating the bars and holding them at rest with a tray-holding platen for receiving the matches, and a cam movement for moving the same for the purpose described.

In witness whereof I have hereunto subscribed my name, on this 2d day of October, 1897, in the presence of two subscribing witnesses.

WILLIAM ERASTUS WILLIAMS.

Witnesses:
   WALTER M. BISBEE,
   FRANK W. MURPHY.